US012320487B2

(12) United States Patent
Huester et al.

(10) Patent No.: US 12,320,487 B2
(45) Date of Patent: Jun. 3, 2025

(54) HEADLAMP FOR VEHICLES AND ACTUATION METHOD

(71) Applicant: HELLA GmbH & Co. KGaA, Lippstadt (DE)

(72) Inventors: Christian Huester, Salzkotten (DE); Boris Kubitza, Moehnesee-Koerbecke (DE); Carsten Wilks, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/893,546

(22) Filed: Sep. 23, 2024

(65) Prior Publication Data

US 2025/0012420 A1    Jan. 9, 2025

Related U.S. Application Data

(63) Continuation of application No. PCT/EP2023/056701, filed on Mar. 16, 2023.

(30) Foreign Application Priority Data

Mar. 23, 2022   (DE) ..................... 10 2022 106 775.0

(51) Int. Cl.
F21S 41/657    (2018.01)
(52) U.S. Cl.
CPC .................. F21S 41/657 (2018.01)
(58) Field of Classification Search
CPC ................................... F21S 41/657
USPC ...................... 362/464, 465, 466; 701/26, 28
See application file for complete search history.

(56) References Cited

U.S. PATENT DOCUMENTS 10,641,454 B2 *   5/2020   Kikuchi ................ F21S 41/148
2010/0264824 A1  10/2010   Goetz et al.
2020/0047807 A1   2/2020   Kim
(Continued)

FOREIGN PATENT DOCUMENTS

DE    102007052745 A1    5/2009
DE    102013215980 A1    2/2015
DE    102015012022 A1    3/2017
(Continued)

OTHER PUBLICATIONS

International Search Report for International Application No. PCT/EP2023/056701 mailed on Jun. 22, 2023.

Primary Examiner — Thomas M Sember
(74) Attorney, Agent, or Firm — Muncy, Geissler, Olds & Lowe, P.C.

(57) ABSTRACT

A headlamp for vehicles comprising a light module containing an image generator unit and an optical unit and comprising an actuation device containing an actuation signal for actuating the image generator unit depending on an operating parameter of the vehicle so that a driving course light distribution is imaged on a roadway. The driving course light distribution has a curved guide line with a radius of curvature during cornering of the vehicle. The image generator unit has a plurality of individually actuatable light-emitting elements and an actuation signal is generated so that the light-emitting elements provided for generating the driving course light distribution are deactivated or partially deactivated if the radius of the curved guide line o be imaged during cornering of the vehicle is smaller than a prespecified threshold value radius of curvatures.

15 Claims, 3 Drawing Sheets

(56) References Cited

U.S. PATENT DOCUMENTS

2022/0024373 A1    1/2022  Sung

FOREIGN PATENT DOCUMENTS

| DE | 102018220813 A1 | 2/2020 |
| DE | 102018216254 A1 | 3/2020 |
| EP | 1334871 A2 | 8/2003 |
| WO | WO 2023083629 A1 | 5/2023 |

* cited by examiner

HEADLAMP FOR VEHICLES AND ACTUATION METHOD

This nonprovisional application is a continuation of International Application No. PCT/EP2023/056701, which was filed on Mar. 16, 2023, and which claims priority to German Patent Application No. 10 2022 106 775.0, which was filed in Germany on Mar. 23, 2022, and which are both herein incorporated by reference.

BACKGROUND OF THE INVENTION

Field of the Invention

The invention relates to a headlamp for vehicles, which includes a light module containing an image generator unit and an optical unit, and which includes an actuation device containing an actuation signal for actuating the image generator unit depending on an operating parameter of the vehicle, so that a driving course light distribution is imaged on a roadway, the driving course light distribution having a curved guide line with a radius of curvature during a cornering of the vehicle.

Description of the Background Art

The invention further relates to a method for actuating a headlamp, an image generator unit of the vehicle being actuated for generating a driving course light distribution on a roadway, depending on vehicle dynamics sensors of a vehicle.

A headlamp for vehicles is known from DE 10 2015 012 022 A1, which includes a light module for generating a driving course light distribution. The driving course light distribution is imaged on the vehicle front area and has two parallel guide lines, which are projected onto the roadway of the vehicle front area at a distance from each other corresponding to a vehicle width. In this way, the current vehicle course may be visualized on the roadway for the driver. The visualization of the guide lines takes place depending on a steering angle of the vehicle or a current radius of curvature of the vehicle and a current velocity, guide lines curved in parallel being projected onto the roadway during a cornering. Imaging the guide lines is useful, in particular, when driving on a construction site, since the driver may easily determine how close the vehicle is to an edge of the traffic lane. Imaging the guide lines on the roadway is also useful during cornering, since the driver may determine how far to turn the steering wheel in order to remain in the traffic lane. During a cornering under a relatively small radius of curvature or a large steering angle, the imaging of the guide lines on the roadway is, however, distracting if a maximum horizontal width of the driving course light distribution is smaller than a width of the traffic lane beyond which the guide lines extend. In this case, the guide lines are truncated. Due to the change in steering angle from right to left and again from left to right in a traffic circle, the guidelines would be truncated multiple times, or the guide lines would be deactivated and activated multiple times within a relatively short period of time.

To avoid this visual distraction or the unfavorable rapid change in the course of the guide lines, the object of the invention is to provide a headlamp for vehicles as well as a method for actuating the headlamp in such a way that the imaging of the guide lines takes place in a way that is useful for the driver during cornering maneuvers having a relatively small radius of curvature.

SUMMARY OF THE INVENTION

It is therefore an object of the invention to provide an image generator unit that includes a plurality of individually actuatable light-emitting elements, whereby an actuation signal is generated, so that the light-emitting elements provided for generating the driving course light distribution are deactivated or partially deactivated if the radius of the curved guide line to be imaged during the cornering of the vehicle is smaller than a predefined threshold radius of curvature.

An advantage of the invention is that, during a cornering of the vehicle, forming a relatively large steering angle, so that the vehicle would move under a relatively small radius of curvature, resulting in the fact that the curved guide lines imaged in the driving course light distribution would have a correspondingly small radius, the light-emitting elements used for generating the driving course light distribution are deactivated or partially deactivated, a predefined threshold value radius of curvature of the curved guide line being dropped below. A distracting, rapid change in the radii of curvature of the imaged guide lines may be advantageously avoided hereby, in particular, during sharp cornering maneuvers which change within a short time sequence, for example when driving through a traffic circle. During the cornering, only the light-emitting elements are activated which are used to generate the vehicle front area light distribution, for example, the low-beam light distribution. A visual distracting effect of the curved guide lines on the roadway may be advantageously avoided hereby.

To further achieve the object, a first light module containing an image generator unit and an optical unit is provided for generating a predefined vehicle front area light distribution, a second light module containing an image generator unit and an optical unit is provided for generating the predefined driving course light distribution, the first light module and the second light module are arranged in a shared housing of the headlamp, the second light module being designed in such a way that a maximum horizontal width of the driving course light distribution is smaller than a maximum horizontal width of the vehicle front area light distribution, an activation signal of this type is generated, the second light module is deactivated or partially deactivated if the radius of the curved guide line to be imaged during the cornering of the vehicle is smaller than a threshold value radius of curvature.

An advantage of the invention is that a distracting, rapid change in the course of the guide lines is avoided during a cornering of the vehicle with a sharp steering angle (driving the vehicle along a curve having a relatively small radius of curvature), for example, in a traffic circle. If a predefined threshold value radius of curvature is dropped below or a predefined threshold value steering angle of the vehicle is exceeded, the second light module of the headlamp provided for imaging the guide lines is partially or completely deactivated. If it is completely deactivated, the driving course light distribution is switched off, so that only the first light module provided for a predefined vehicle front area light distribution is switched on. A partial deactivation of the second light module takes place by shortening a length of the imaged curved guide lines. The end-side shape of the guide lines may be advantageously retained hereby. Otherwise, the one end of the curved guide lines would be "truncated" by the limited horizontal illumination width of the second light module in such a way that the end of the imaged curved guide lines would have a sloped shape. The limitation of the guide lines is predefined, in particular, by a maximum width of the driving course light distribution. It is assumed that the dropping below of the threshold radius of curvature may occur during a right cornering as well as during a left cornering. The size of the curvature to the left or right is crucial, so that, when it comes to determining the actuation signal, it does not matter whether the cornering is a right cornering or a left cornering. The same activation of the second light module therefore takes place for the right cornering as well as for the left cornering. The invention thus facilitates a reassuring representation of the guide lines on the roadway during cornering maneuvers, in particular in traffic circles, which increases the acceptance of the driving course light distribution for the driver.

The threshold value radius of curvature can be dependent on the maximum horizontal width of the driving course light distribution. The smaller the maximum horizontal width of the driving course light distribution, the greater is the threshold value radius of curvature in terms of absolute value, which, when dropped below, results in the deactivation of the second light module.

The imaged guide lines can be shortened as soon as the current radius of curvature of the vehicle drops below the threshold value radius of curvature and ends of the guide lines thus strike the horizontal boundary of the driving course light distribution. In this way, a continuous and non-abrupt moving away of the imaged guide lines is facilitated during cornering maneuvers with a small radius of curvature or upon a rapid changing of the radius of curvature.

The switching on of the second light module after the deactivation thereof does not takes place again until the threshold value radius of curvature has been exceeded in terms of absolute value and a straight trajectory signal of the vehicle is present. During a cornering in a traffic circle, the driving course light distribution of the vehicle is therefore deactivated when the vehicle is in the traffic circle or enters the traffic circle. The second light module is reactivated upon leaving the traffic circle. A distracting movement or flickering of the imaged guide lines on the roadway in the traffic circle is advantageously prevented hereby.

The second light module is reactivated after the deactivation thereof when a predefined threshold value velocity of the vehicle is exceeded. A flickering on of the guide lines during a brief straight driving trajectory in the traffic circle is prevented in this way.

An activation of the second light module can take place when a straight trajectory signal or a straight driving trajectory of the vehicle is present. This makes it possible to advantageously prevent a brief flickering on of the guide lines while driving in a traffic circle at the point of changing from a right-hand bend to the left-hand bend and vice versa.

The maximum width of the vehicle front area light distribution can be smaller than a width of the traffic lane or smaller than a horizontal angle range of +/−12° or +/−10°. The second light module is thus limited to the imaging of guide lines or the imaging of symbols situated in narrow horizontal region. The costs of the light module may be reduced hereby.

To further achieve the object, the method is characterized in that the image generator unit is deactivated or partially deactivated as soon as a current radius of curvature of the vehicle is smaller than a predefined threshold value radius of curvature, and the image generator unit is reactivated only as soon as the current radius of curvature is larger than the threshold value radius of curvature and a straight driving trajectory of the vehicle is present.

According to the method according to the invention, a deactivation of an image generator unit used to generate a driving course light distribution takes place as soon as a current radius of curvature of the vehicle is smaller than a predefined threshold value radius of curvature. When cornering at a relatively high steering angle, a deactivation of the driving course light distribution thus takes place so that an undesirable changing representation of the guide lines imaged on the roadway is prevented. The image generator unit is not reactivated until the vehicle is on a straight driving trajectory, which is detected by a corresponding straight trajectory signal. The straight trajectory signal may be ascertained by the current steering angle of the vehicle. A straight trajectory signal is not present until the steering angle is again 0°, so that the image detector unit may be reactivated.

The straight trajectory signal may not be generated until the vehicle has been on a straight driving trajectory for a predefined period of time of at least a time threshold value or has a steering angle equal to zero. This prevents the guide lines from being imaged again even though the vehicle is still entering a further bend after a short piece of straight roadway.

A partial deactivation of the image generator unit takes place when the current radius of curvature of the vehicle drops below the predefined threshold value radius of curvature during cornering. The length of the guide lines is shortened hereby, so that the imaged guide lines are not projected onto the roadway abruptly but only gradually.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
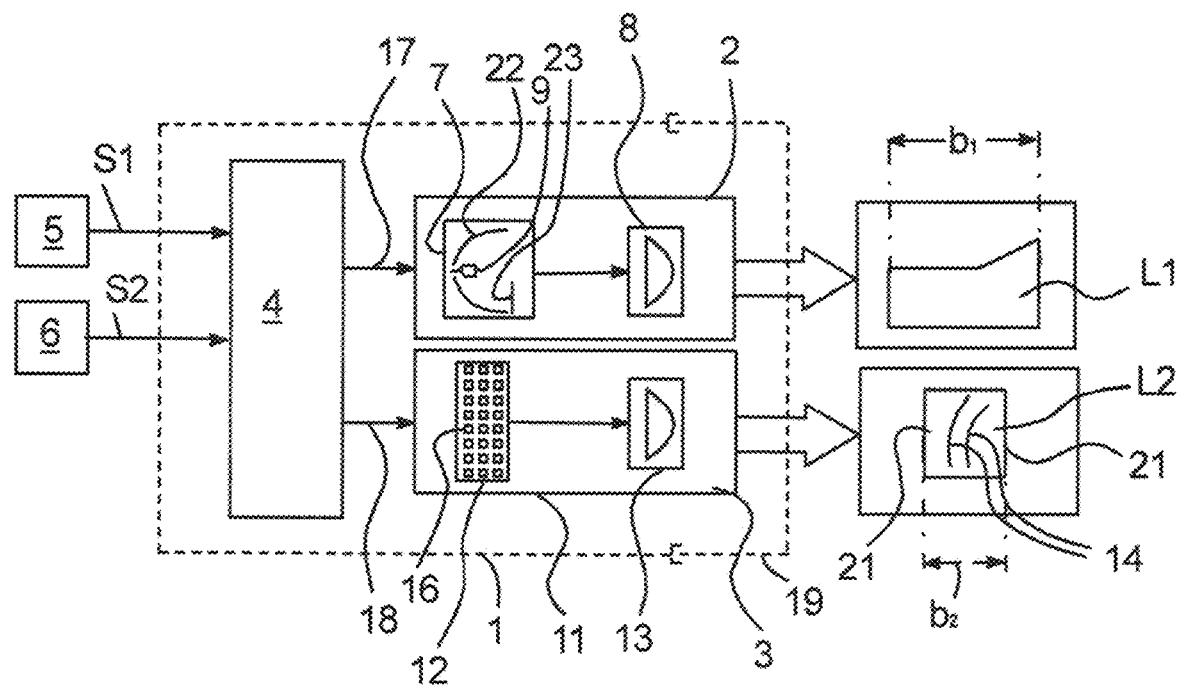
FIG. 1 shows a schematic representation of a headlamp according to the invention.

A headlamp for vehicles F includes a housing 1, in which a first light module 2 and a second light module 3 as well as an actuation device 4 for actuating first light module 2 and second light module 3 are arranged. A plurality of sensors 5, 6. which each provide sensor signals S1, S2 of actuation device 4, are arranged outside housing 1. A first sensor 5 is designed as a steering angle sensor, which provides the steering angle as a sensor signal S1. A second sensor 6 is designed as a velocity sensor, which provides the velocity of vehicle F as a sensor signal S2. Computing components, i.e. a memory, processor, etc. are provided in actuation device 4, so that a current radius of curvature r, under which vehicle F is on a straight driving trajectory or in a cornering, is calculated from sensor signal S1. On the straight driving trajectory, steering angle sensor signal S1 is equal to zero, or radius of curvature r approaches infinity, so that the straight trajectory signal is detected by actuation device 4.

First light module 2 includes an image generator unit 7 and an optical unit 8 for generating a predefined vehicle front area light distribution L1. Vehicle front area light distribution L1 may be, for example, a low-beam light distribution or a high-beam light distribution. Image generator unit 7 may include, for example, a light source (halogen lamp), a reflector 22, and a screen 23. The light generated by image generator unit 7 is imaged with the aid of optical unit 8 designed as a lens according to the low-beam light distribution or high-beam light distribution.

Vehicle front area light distribution L1 generated by first light module 2 has a maximum horizontal width $b_1$, which may correspond to a horizontal range of +/−30°.

A second light module 11 includes an image generator unit 12 and an optical unit 13 for generating a driving course light distribution L2. Driving course light distribution L2 has two parallel guide lines 14, which are imaged with the aid of optical unit 13 on roadway 10 or a traffic lane 15 arranged in front of vehicle F. Image generator unit 12 of second light module 11 may form, for example, a matrix of light sources 16, which may each be actuated individually. For example, image generator unit 12 or second light module 11 may be suitable for imaging symbols instead of guide lines 14, for example a puddle light, onto roadway 10 in the front area of vehicle F. First light module 2 is a high-resolution light module, which may have, for example, a matrix of light sources 9 in 256 rows and 64 columns for forming more than 16,000 light pixels.

First light module 2 or image generator unit 7 of first light module 2 is actuated by an actuation signal 17 of actuation device 4. Second light module 11 or image generator unit 12 thereof is actuated by an actuation signal 18 of actuation device 4.

Second light module 11 or image detector unit 12 thereof may be actuated by actuation device 4 in such a way that guide lines 14 running in parallel to each other extend on traffic lane 15 in extension of a side edge of vehicle F. Maximum horizontal width $b_2$ of driving course light distribution L2 is generally too small, so that guide lines 14 may not be projected in a curved shape onto traffic lane 15 of vehicle F during cornering. Maximum horizontal width $b_2$ of driving course light distribution L2 may correspond to a horizontal angle range φ, which is smaller than +/−12°, preferably smaller than +/−10°.

Cup-shaped housing 1 is closed by a transparent cover shield 19. Cover shield 19 may be designed to be transparent or be provided with optical elements.

Actuation device 4 may include a microcontroller having a memory, in which a cornering control program is implemented to generate actuation signal 18.

Figure 2:
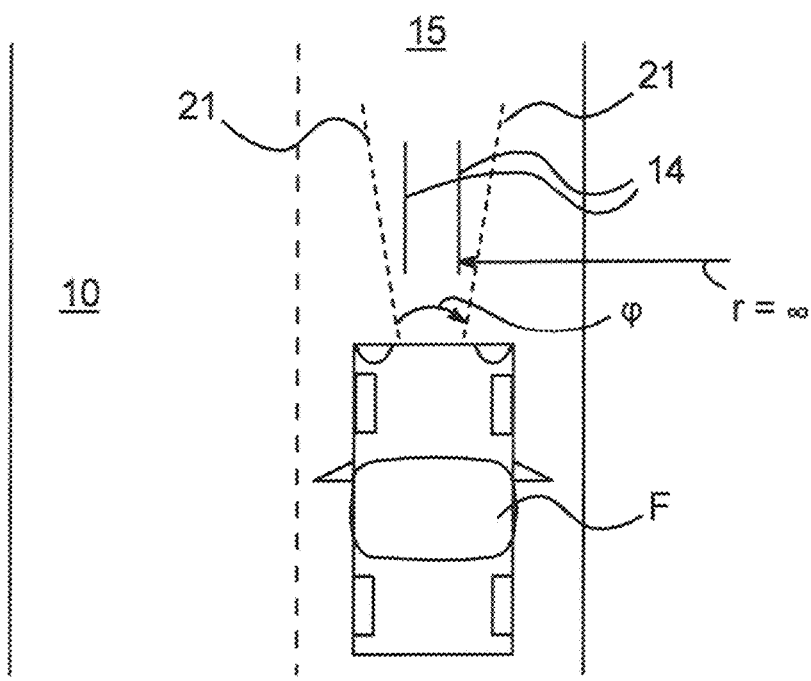
FIG. 2 shows a schematic top view of a vehicle on a straight driving trajectory.

As is apparent from FIG. 2, second light module 11 is actuated with the aid of actuation signal 18 of actuation device 4 in such a way that the two parallel guide lines 14 are projected on traffic lane 15 in a straight line. During this straight driving trajectory, the steering angle is zero or current radius of curvature r is equal to ∞.

Figure 3:
FIG. 3 shows a schematic top view of the vehicle while cornering, in which the radius of curvature of the vehicle corresponds to a threshold value radius of curvature.
Figure 3:
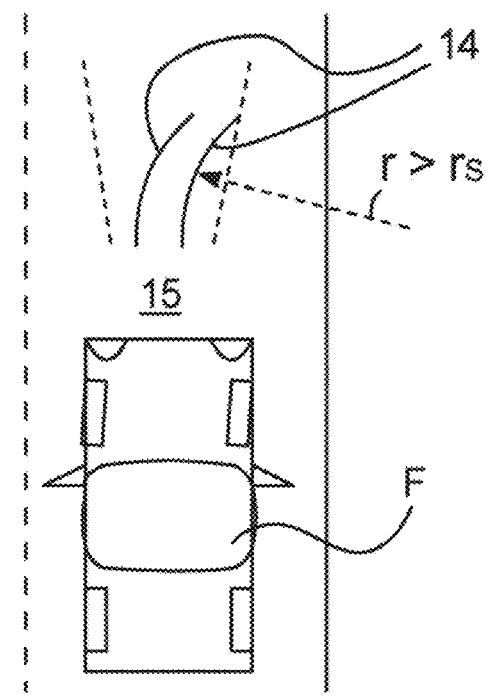

If vehicle F is in a cornering maneuver according to FIG. 3 whose current radius of curvature r is greater than or equal to a threshold value radius of curvature $r_S$, guide lines 14 run at least partially along a circular path in the direction of the bend. When cornering to the right, guide lines 14 run to the right in an arc-shaped manner in the direction of travel of vehicle F. In a left-hand bend, guide lines 14 run to the left in the direction of travel of vehicle F.

Figure 4:
FIG. 4 shows a top view of the vehicle while cornering, in which the current radius of curvature is smaller than the threshold value radius of curvature, the guidelines imaged on the roadway being deactivated.
Figure 4:
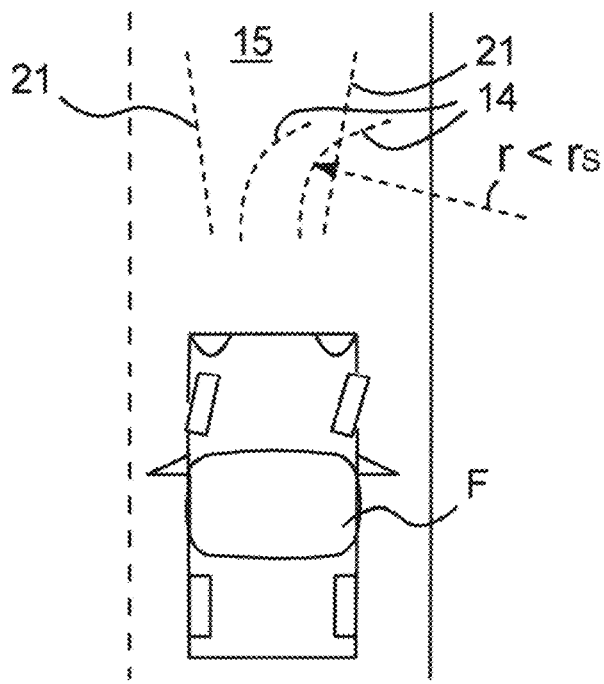

If vehicle F is in a relatively sharp right-hand bend, as is apparent from FIG. 4, in which current radius of curvature r is smaller than threshold value radius of curvature $r_S$, second light module 11 or image detector unit 12 thereof is actuated by actuation device 4 in such a way that light sources 16 of image detector unit 12 are switched off. After all, due to the large steering angle in terms of absolute value, guide lines 14 would be arranged partially in a region outside maximum horizontal width $b_2$ of driving course light distribution L2; cf. dashed line. In particular during a cornering of vehicle F in a traffic circle 20 according to FIG. 6, differently curved guide lines 14 would otherwise be imaged in rapid succession, due to the change in direction during cornering, which would have a distracting effect on the driver of vehicle F. In this respect, according to a first variant of the invention according to FIG. 4, second light module 11 is deactivated or switched off if current radius of curvature r of vehicle F drops below threshold value radius of curvature $r_S$.

Figure 5:
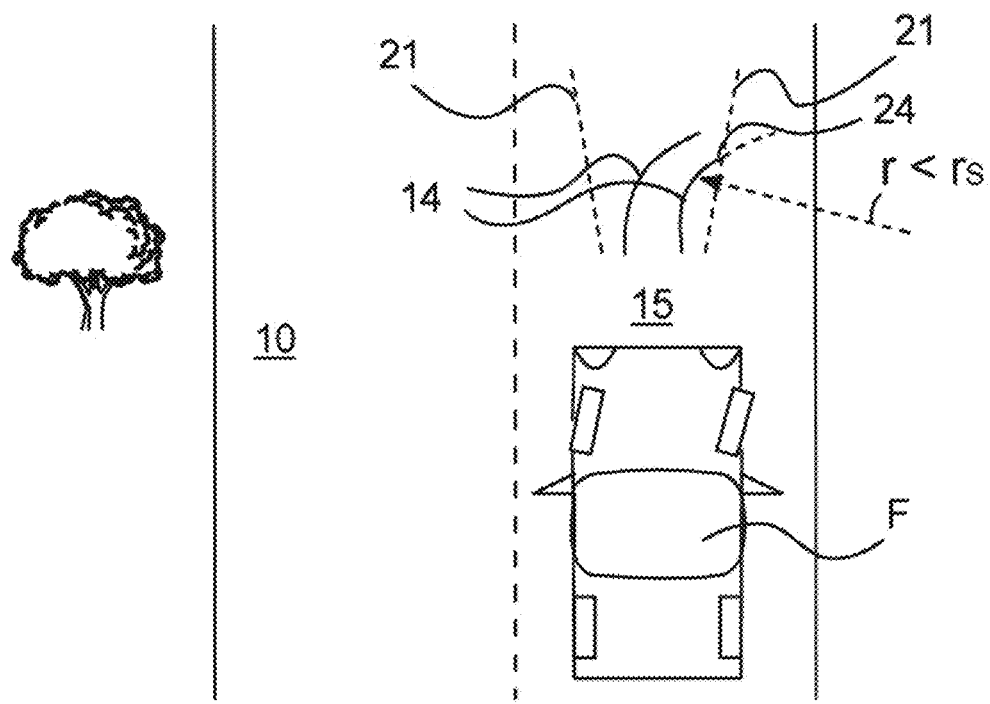
FIG. 5 shows a top view of a cornering of the vehicle with a current radius of curvature which is smaller than the threshold value radius of curvature, shortened guide lines being imaged on the roadway.

According to a second variant of the invention according to FIG. 5, second light module 11 is partially deactivated if vehicle F drops below threshold value radius of curvature $r_S$ with current radius of curvature r. In this case, light sources 16 of image detector unit 12 are actuated in such a way that curved guide lines 14 have a reduced length compared to a straight driving trajectory of vehicle F, solid lines of guide lines 14 have the reduced length, the solid and dashed guide lines 14 have the normal length during the straight driving trajectory. Curved guide lines 14 are shortened to the extent that a front end 24 of guide lines 14 are aways at horizontal boundary 21, or at a distance therefrom, of driving course light distribution L2 shown on a measuring screen. A uniform shape of end 24 of guide line 14 is always ensured in this way. If the length of guide lines 14 is not shortened, guide lines 14 would be cut off by horizontal boundary 21, so that the imaged shape of this end 24 would undergo an undesirable widening on roadway 10. The maximum length of guide lines 14 is predefined by the maximum imaging capacity of that guide line 14 which is situated on the side on which vehicle F moves. If the cornering is a cornering to the right, right-hand guide line 14 predefines the maximum length. The maximum length of right-hand guide line 14 is determined by maximum horizontal width $b_2$ of driving course light distribution L2.

At a sharper steering angle, the length of guide lines 14 may thus be gradually reduced.

The deactivation may also possibly take place by dimming light sources 16, so that the transition from a cornering having a radius of curvature r greater than or equal to threshold value radius of curvature $r_S$ to the cornering having a radius of curvature r less than threshold value radius of curvature $r_S$ takes place homogeneously. A shortening of the length of guide lines 14 from a length according to the straight driving trajectory according to FIG. 2 or a cornering having a radius of curvature greater than threshold value radius of curvature $r_S$ according to FIG. 3 takes place, in particular, if one of guide lines 14 touches a horizontal boundary 21 of driving course light distribution L2 during cornering.

The activation of second light module 11 is explained below on the basis of a cornering in a traffic circle, i.e., in a traffic circle 20 according to FIG. 6.

When vehicle F approaches traffic circle 20 in a straight line, guide lines 14 are projected onto traffic lane 15. Vehicle F is on a straight driving trajectory, so that current radius of curvature r of vehicle F is greater than threshold value radius of curvature $r_S$. Due to steering angle S1=0, a straight trajectory signal $S_g$ is 1. This means that vehicle F is on a straight driving trajectory.

When vehicle F enters traffic circle 20, and the steering wheel of vehicle F turns to the right, the steering angle increases, and current radius of curvature r is reduced, threshold value radius of curvature $r_S$ being dropped below. Straight trajectory signal $S_g$ changes from 1 to 0, since the steering angle is not equal to zero. Actuation signal 17 is changed in such a way that second light module 11 or image detector unit 12 thereof is now deactivated. This means that no guide lines 14 are imaged on traffic lane 15.

Figure 6:
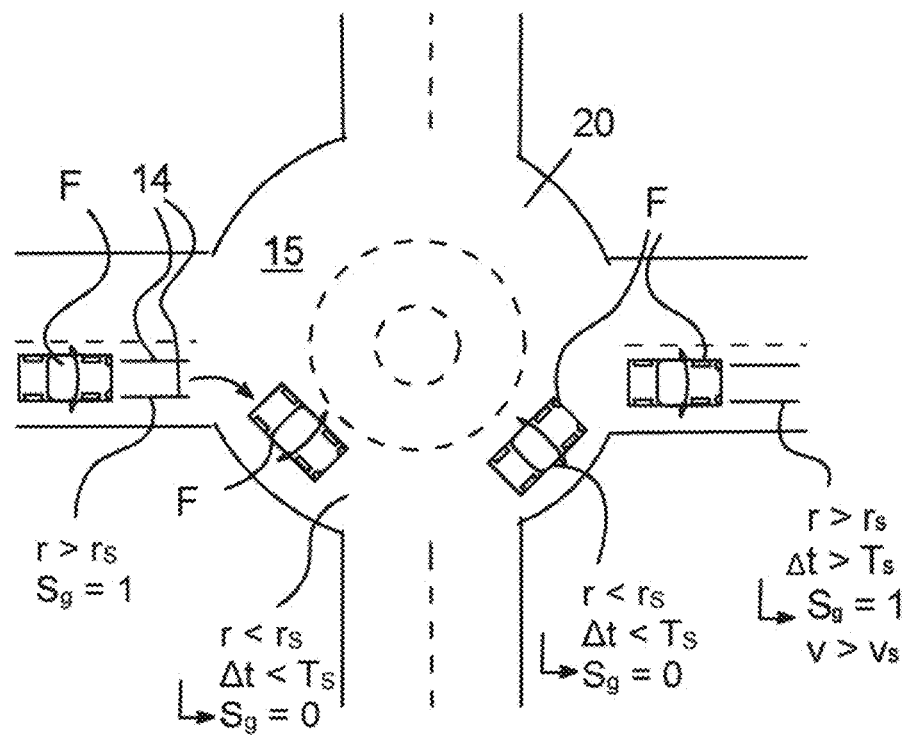
FIG. 6 shows a top view of a cornering of the vehicle in a traffic circle.

During the further course of driving through the traffic circle, vehicle F takes an arc-shaped trajectory, cf. arrow direction in FIG. 6, so that the steering angle changes in the opposite direction from right to left upon entering traffic circle 20. When the steering wheel swivels from the right-hand rotational position to the left-and rotational position, the steering angle passes zero. However, this takes place briefly or within a time interval Δt, which is smaller than a predefined time threshold value $T_S$. In this respect, straight trajectory signal $S_g$ continues to have the value zero. If time interval Δt in which the steering angle is equal to zero or radius of curvature r approaches s∞ were to be larger than time threshold value $T_S$, straight trajectory signal $S_g$ would change from zero to one. Only then would a straight driving trajectory be detected.

It is apparent that current radius of curvature r is reduced in size upon entering the traffic circle and exceeds threshold value radius of curvature $r_S$. Starting at this point in time, second light module 11 is deactivated. During the further course of driving through the traffic circle, vehicle F undergoes a cornering from a right-hand bend to a left-hand bend, so that radius of curvature r further increases. As long as it remains under threshold value $r_S$ in terms of absolute value, the sharp cornering is detected, so that no guide lines 14 are imaged. Only after leaving traffic circle 20 does current radius of curvature r of vehicle F increase in such a way that it exceeds threshold value $r_S$. If the straight driving trajectory is additionally detected after the expiry of time interval Δt, second light module 11 is reactivated with the generation of straight trajectory signal $S_g$=1, so that guide line 14 are imaged on traffic lane 15.

The actuation of second light module 11 or first light module 2 takes place in real time, so that the actuation signals are generated immediately upon the change of operating parameters (steering angle, driving velocity).

Threshold value radius of curvature $r_S$ is preferably dependent on maximum horizontal width $b_2$ of driving course light distribution L2.

Straight trajectory signal $S_g$ may also be generated if, instead of exceeding time threshold value $T_S$, a threshold value velocity vs of vehicle F is exceeded by a velocity of vehicle F.

The entry into traffic circle 20 is detected by the aforementioned operating parameters or by a camera installed in vehicle F or by map material made available to vehicle F.

In an example, only a single light module may also be provided, which is used to generate vehicle front area light distribution L1 and to generate driving course light distribution L2. This light module includes an image generator unit having a plurality of individually actuatable light-emitting elements, on the one hand, and an optical unit having, for example, a lens ad/or a reflector, on the other hand.

The light-emitting elements of the image generator unit may be formed by a plurality of light sources arranged in the manner of a matrix, which are arranged, for example, on a chip. Alternatively, the image generator unit may include a plurality of pivotable micromirror elements (DMD) or a liquid crystal display (LCD or LCOS) having a plurality of liquid crystal elements, which are each individually actuatable, to generate desired light distribution L1. The micromirror elements or the liquid crystal elements also form light-emitting elements. Since a permeability or a non-permeability of light generated by a light source is effectuated by the actuation thereof.

The light-emitting elements of the image detector unit actuatable for generating driving course light distribution L2 are actuated in the same way as light-emitting elements 16 of image generator 12 of second light module 11 already described above.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A headlamp for vehicles, the headlamp comprising:
a light module having an image generator unit and an optical unit; and
an actuation device providing an actuation signal to actuate the image generator unit depending on an operating parameter of the vehicle so that a driving course light distribution is imaged on a roadway, the driving course light distribution having a curved guide line with a radius of curvature during a cornering of the vehicle,
wherein the image generator unit includes at least two individually actuatable light-emitting elements, and
wherein the actuation signal is generated, so that the light-emitting elements provided for generating the driving course light distribution are deactivated or partially deactivated if the radius of the curved guide line to be imaged during the cornering of the vehicle is smaller than a predefined threshold value radius of curvature.

2. The headlamp according to claim 1, wherein the threshold value radius of curvature is dependent on the maximum horizontal width of the driving course light distribution.

3. The headlamp according to claim 1, wherein the second light module is actuated such that a length of the guide lines is shortened if the current radius of curvature of the vehicle drops below the predefined threshold value radius of curvature.

4. The headlamp according to claim 1, wherein the second light module is actuated such that the second light module is activated if the current radius of curvature of the vehicle drops below the predefined threshold value radius of curvature and if a straight trajectory signal is present.

5. The headlamp according to claim 1, wherein the second light module is actuated such that the second light module is activated if a velocity of the vehicle exceeds a predefined threshold value velocity.

6. The headlamp according to claim 1, wherein the second light module is actuated such that the second light module is activated upon exceeding the threshold value radius of curvature and if a straight trajectory signal is present within a time interval greater than a time threshold value.

7. The headlamp according to claim 1, wherein a steering wheel steering signal of the vehicle and/or a driving velocity signal is/are provided as operating parameters.

8. The headlamp according to claim 1, wherein the driving course light distribution has two parallel guide lines, which are imaged within a traffic lane on the roadway.

9. The headlamp according to claim 1, wherein the image generator unit of the first light module includes a matrix of light sources or a light source and a matrix of liquid crystal elements or micromirror elements, the light sources or liquid crystal elements or micromirror elements being able to be actuated individually.

10. The headlamp according to claim 1, wherein an entry into a traffic circle is detectable by the operating parameters and/or a camera installed in the vehicle and/or by the map material available in the vehicle.

11. A headlamp for vehicles, the headlamp comprising:
a light module having an image generator unit and an optical unit;
an actuation device providing an actuation signal to actuate the image generator unit depending on an operating parameter of the vehicle so that a driving course light distribution is imaged on a roadway, the driving course light distribution having a curved guide line with a radius of curvature during a cornering of the vehicle;
a first light module having an image generator unit and an optical unit is provided for generating a predefined vehicle front area light distribution; and
a second light module having an image generator unit and an optical unit to generate the predefined driving course light distribution,
wherein the first light module and the second light module are arranged in a shared housing of the headlamp, the second light module being designed such that a maximum horizontal width of the driving course light distribution is smaller than a maximum horizontal width of the vehicle front area light distribution, and
wherein the actuation signal is generated such that the second light module is deactivated or partially deactivated if the radius of the curved guide line to be imaged during the cornering of the vehicle is smaller than a threshold value radius of curvature.

12. A method for actuating a headlamp, the method comprising:
actuating an image generator unit of a vehicle depending on vehicle dynamics sensors of the vehicle to generate a driving course light distribution on a roadway;
deactivating or partially deactivating the image generator unit as soon as a current radius of curvature of the vehicle is smaller than a predefined threshold value radius of curvature, the image generator unit being not reactivated until the current radius of curvature is greater than the threshold value radius of curvature and as soon as a straight driving trajectory of the vehicle is present.

13. The method according to claim 12, wherein a straight trajectory signal is generated when the vehicle is driving in a straight direction for a time period of at least a time threshold value.

14. The method according to claim 12, wherein the actuation of the first and second light modules is calculated in real time.

15. The method according to claim 12, wherein a length of the guide lines of the driving course light distribution is shortened upon the reduction of the current radius of curvature of the vehicle, in which the current radius of curvature is smaller than the threshold value radius of curvature.

* * * * *